March 3, 1931. R. E. DE WALT 1,794,836
WOODWORKING MACHINE
Filed March 3, 1928 3 Sheets-Sheet 1
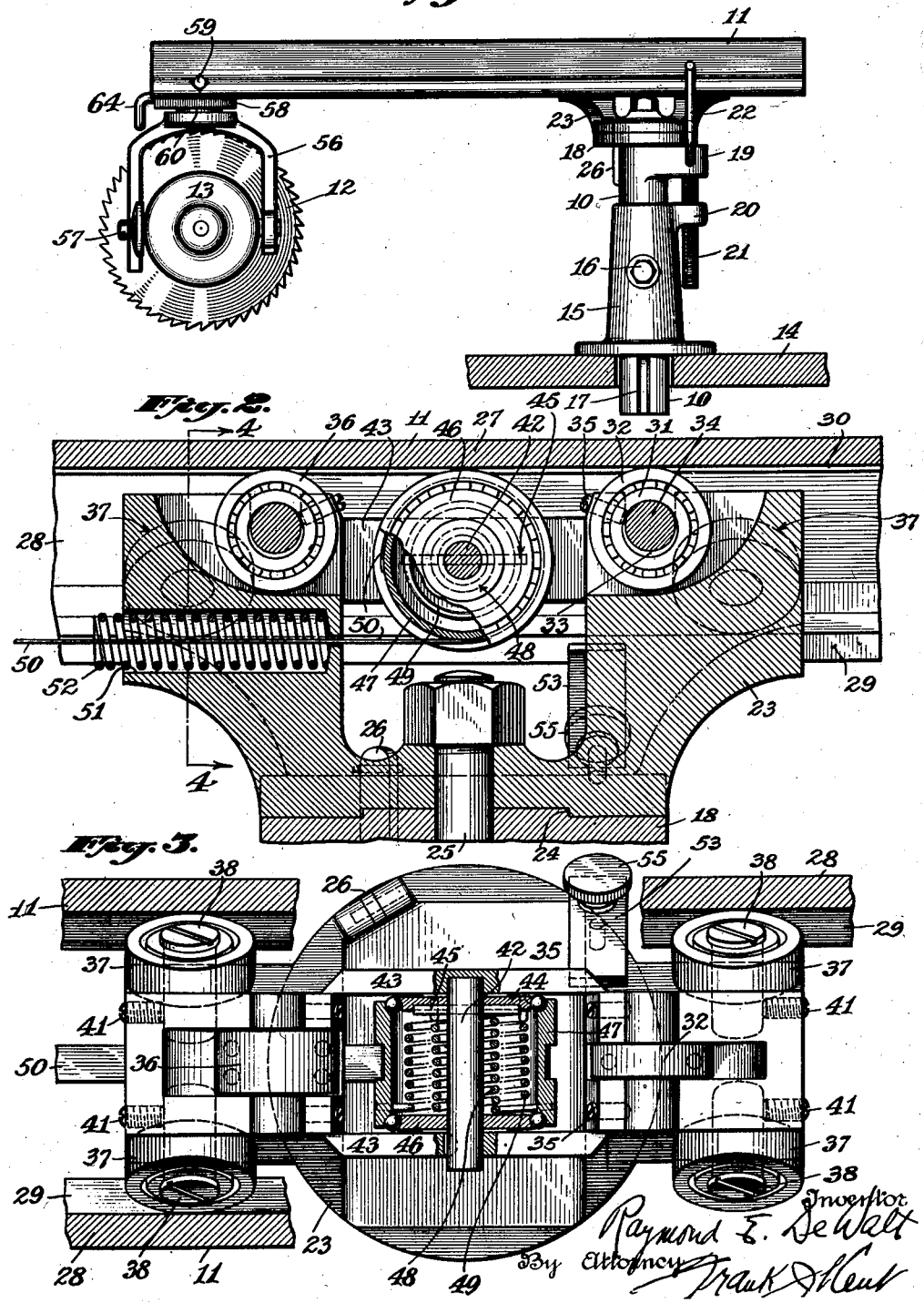

March 3, 1931. R. E. DE WALT 1,794,836
WOODWORKING MACHINE
Filed March 3, 1928 3 Sheets-Sheet 2
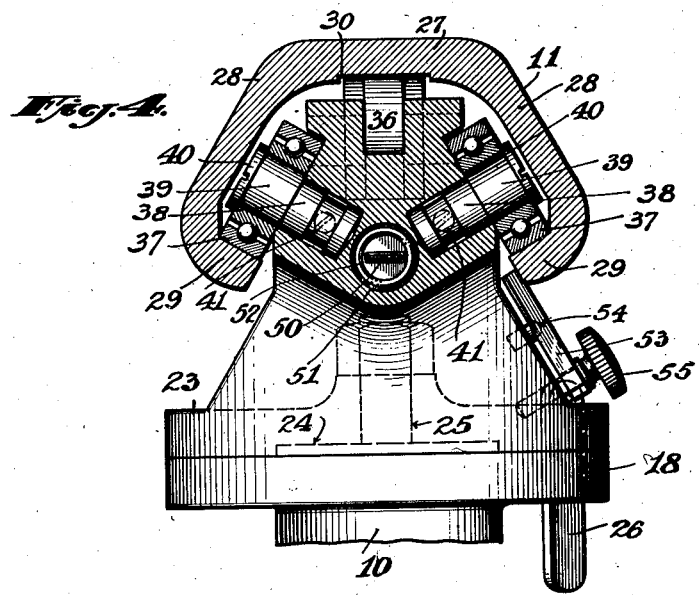
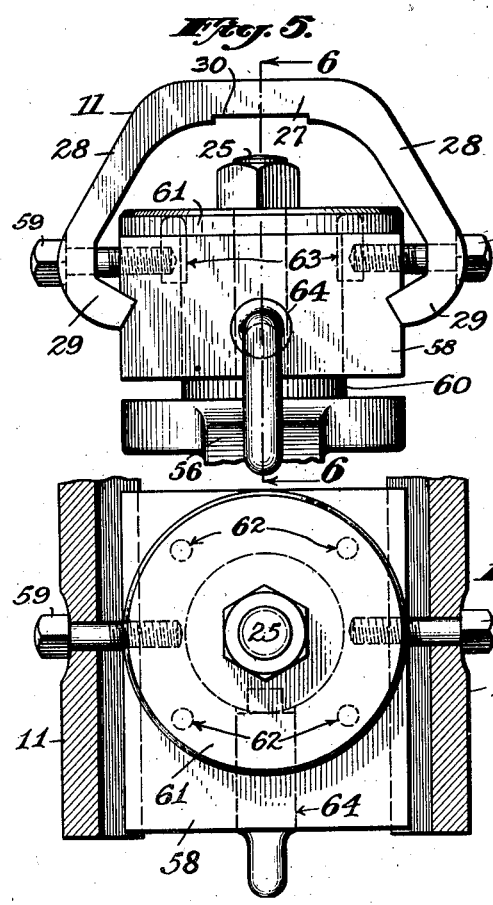
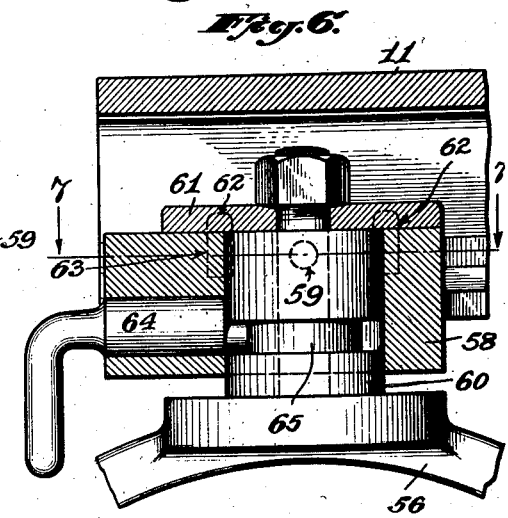
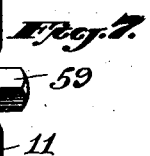
Inventor
Raymond E. DeWalt
By his Attorney
Frank H. Kent

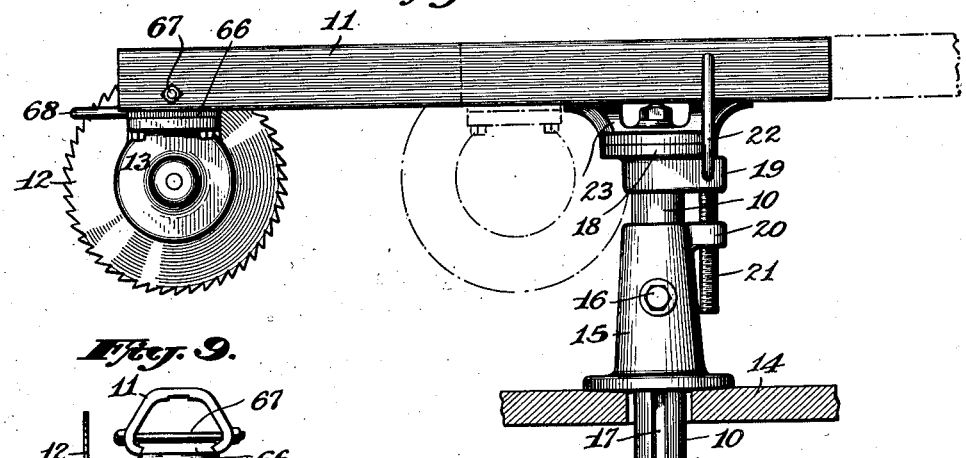
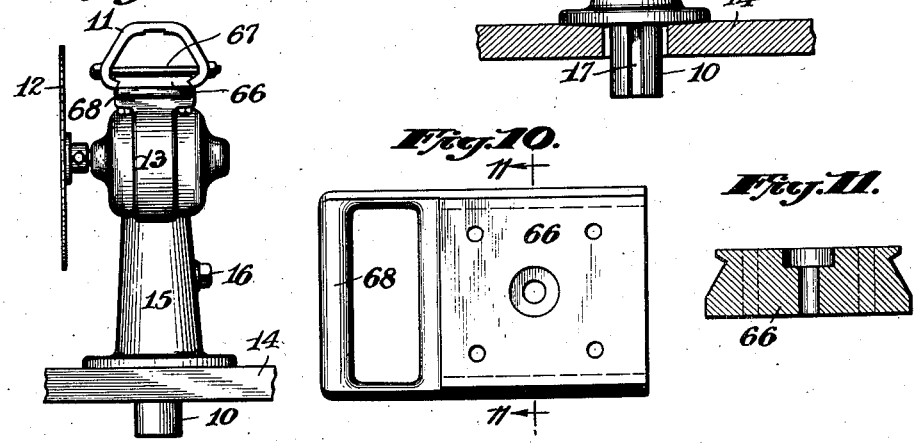
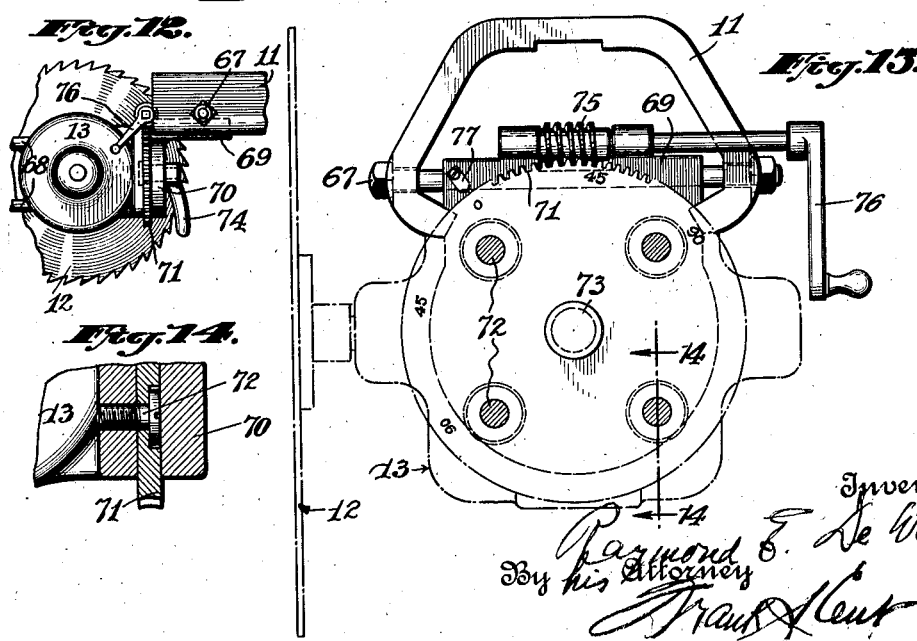

Patented Mar. 3, 1931

1,794,836

UNITED STATES PATENT OFFICE

RAYMOND ELMER DE WALT, OF LEOLA, PENNSYLVANIA, ASSIGNOR, BY MESNE ASSIGNMENTS, TO DE WALT PRODUCTS CORPORATION, OF LANCASTER, PENNSYLVANIA

WOODWORKING MACHINE

Application filed March 3, 1928. Serial No. 258,720.

This invention relates to a woodworking machine of the type in which a circular saw is directly driven by a motor and is mounted for angular adjustment, provision being made for translatory movement of the saw relative to the work.

An object of the present invention is the provision of improved means for accurately and firmly guiding the saw in its translatory movement, but permitting easy operation of the saw so that it can be manipulated with a minimum of effort.

The invention also includes the provision of spring means for automatically returning the motor to its initial position after it has been pulled through a cutting movement by the operator.

An additional feature of the invention covers novel means for mounting the saw and motor, including, in one particular embodiment, means for accurately setting the saw in positions of angular adjustment.

Further features of the invention will become apparent in the course of the following detailed description.

While preferred embodiments have been disclosed for purposes of illustration, it should be understood that various changes and modifications may be made in the structure without departing from the spirit and scope of the invention as hereinafter set forth and claimed.

In the drawings:

Fig. 1 is a side elevation of the machine.

Fig. 2 is a vertical section through part of the supporting mechanism.

Fig. 3 is a horizontal section through the mechanism of Fig. 2.

Fig. 4 is a section on line 4—4 of Fig. 2.

Fig. 5 is an end elevation of the traveling arm of Fig. 1.

Fig. 6 is a section on line 6—6 of Fig. 1.

Fig. 7 is a section on line 7—7 of Fig. 6.

Fig. 8 is a side elevation of a modified machine, showing the parts in a different operative position from that of Fig. 1.

Fig. 9 is an end elevation from the left end of Fig. 8.

Fig. 10 is a plan view of the mounting block used in Fig. 8.

Fig. 11 is a section on line 11—11 of Fig. 10.

Fig. 12 is a side elevation of the left end of the traveling arm showing a further modification of the saw mounting.

Fig. 13 is an elevation from the left end of Fig. 12.

Fig. 14 is a section on line 14—14 of Fig. 13.

Referring to the drawings more particularly, the machine comprises in general a supporting post 10 mounted non-rotatively for vertical adjustment, a traveling arm 11 movable across the head of post 10, and a rotary saw 12, directly driven by motor 13, both saw and motor being mounted on the end of arm 11 in a manner permitting angular adjustment of the saw.

The supporting structure includes a base 14 to which the sleeve 15 is rigidly fastened. The post 10 fits slidably within the sleeve 15, but relative rotation between post and sleeve 15 is prevented by a spline-bolt 16 mounted in the sleeve 15 and extending into a keyway 17 in post 10. The upper end of post 10 is formed with a flattened table 18 and a boss 19 projects from one side of the post in line with a similar boss 20 formed on sleeve 15. A screw rod 21 is rotatably carried in boss 19 and threadedly engages boss 20 so that vertical adjustment of post 10 is secured by rotating screw rod 21 through suitable mechanism such as crank 22, which is connected to the screw rod by gears, not visible in the drawing.

A bearing head 23 rests on the table 18, and the table carries a circular boss 24 projecting into a corresponding depression formed in the bearing head 23, and a bolt 25 holds the parts in firm engagement but permits rotation of the bearing head relative to post 10. Means are provided for locking the bearing head in any one of a series of angular positions, said means being illustrated in the form of a latch 26 pivoted to the bearing head 23 and adapted to engage one of a series of notches formed in the periphery of the table 18.

The parts are so arranged that the traveling arm 11 rides over non-friction bearings carried by the bearing head 23. The arm 11 is shaped like an inverted U-shaped beam, having a top 27, divergent sides 28, and flanges 29 extending inwardly and downwardly from the lower edges of the sides 28. The underside of the top 27 is machined to form a bearing track 30, and the inner sides of the flanges 29 are machined for a similar purpose.

For cooperation with the bearing track 30 a plurality of bearings project above the top of the bearing head 23 (Fig. 2). On the right side of the bearing head (as seen in Figs. 1, 2 and 3) a single ball-bearing of a well-known type is mounted. This bearing consists of an inner race 31, an outer race 32, and a series of balls running between the races. The inner race 31 is carried on an eccentric 33 formed on shaft 34, which is non-rotatably held in adjusted position by set screw 35. The bearing track 30 is adapted to roll over the outer periphery of the outer race 32, and the height of the top point of the outer race 32 above the bearing head 23 can be varied by loosening set screw 35 and adjusting the position of the eccentric 33. A bearing 36, mounted on the left side of the top of bearing head 23, is similar to the bearing just described, except that it is a double bearing to carry the loads imposed by the saw.

Each end of the bearing head 23 carries a pair of ball bearings 37 mounted on stud shafts 38. Each shaft 38 is set into the side of head 23 at an angle so that it is parallel to the inner surface of the corresponding flange 29. An eccentric 39 is formed near the outer end of each shaft to carry the bearing, and a screw head 40 retains the bearing in place and provides means for adjusting the position of the eccentric after the set screw 41 has been loosened.

At the time of assembly the bearings are so adjusted that the traveling arm 11 will ride freely over the bearing head without undue play. Should lost motion develop due to wear, the side bearings 37 can easily be adjusted to compensate for the wear. While ball bearings have been disclosed, it will be clear that rollers, or any other type of bearings could be used.

The invention includes means for normally biasing the saw head toward the supporting post. This means, which is shown in Figs. 2 and 3, includes a shaft 42 keyed to plates 43 carried by the bearing head 23. A disc 44 is adjustably secured to shaft 42 by the key 45 and a similar disc 46 is mounted near the opposite end of shaft 42. A drum 47 runs over ball bearings confined between its inner periphery and races formed on the disc 44 and 46. A coiled spring 48 surrounds the shaft and has one end anchored to the disc 44 while its other end is secured to the drum 47, and a second spring 49 of larger diameter surrounds spring 48 and has its ends similarly fastened. A metal strap 50 has one end secured in a run-way formed in the outer surface of drum 47, passes through a bore 51 formed in the bearing head 23, and has its opposite end attached to the saw head at the left end of traveling arm 11. A coiled buffer spring 52 is mounted in the bore 51, and the parts are so adjusted that normally the springs 48 and 49 hold the arm 11 at the right-hand end of its travel with the saw head contacting with buffer spring 52, as shown in Fig. 8. When the saw head is pulled toward the left during a cutting operation the springs 48 and 49 are loaded, and when the saw head is released the springs return it to its right-hand position.

A clamp is provided for locking the arm 11 at any point in its travel. This clamp may be of any convenient type, and is illustrated (Figs. 3 and 4) as a bar 53 pivoted on a fulcrum 54 carried by the bearing head 23. The upper end of bar 53 engages under one of the flanges 29, while its lower end is adapted to be pressed inwardly by a thumb screw 55, so that screwing down on the thumb screw will press the upper end of bar 53 outwardly into clamping engagement with the traveling arm 11.

The saw may be mounted on the left end of the traveling arm in a variety of ways. Thus in some instances it is desirable to provide for angular adjustment of the saw, both vertically and horizontally, and this may be done with a mounting as illustrated in Figs. 1, 5, 6 and 7.

In this case the motor carrying the saw is mounted on a horizontal axis in a yoke 56, and a holding nut 57 permits angular adjustment of the saw about this horizontal axis. The yoke 56 is itself mounted for adjustment about a vertical axis.

This is done by means of the saw head 58, rigidly clamped in the end of arm 11 by bolts 59, and a vertical stud 60 projecting from the yoke and rotatable in a bore formed through the head 58. A disc 61 is bolted to the upper end of stud 60, and provides a flange extending over the top of the saw head 58. A plurality of holes 62 are formed in the lower side of the disc 61 for cooperation with pins 63 carried by head 58. The stud 60 is moved vertically by a cam shaft 64 engaging a groove 65 in the stud. When it is desired to adjust the yoke 56 about its vertical axis the stud 60 is raised by means of camshaft 64 until the disc 61 clears the pins 63. The yoke may then be rotated until the pins 63 engage the holes 62 in some other position, when the yoke is again lowered by camshaft 64. Any suitable number of positions for the yoke 56 can be supplied by furnishing the proper number and arrangement of pins 63 and holes 62.

In case the motor is to be rigidly and non-adjustably mounted in the arm 11 the mounting illustrated in Figs. 8 to 11 can be used. In that case the saw head 66 is substituted for the one previously described, and is clamped in place by a bolt 67 passing through the sides of the arm 11. The motor 13 carrying the saw 12 is then bolted directly to the under side of the saw head 66. A handle 68 projecting forwardly from the head 66 provides convenient means for manipulating the saw.

For certain uses it is important that the user be able to adjust the saw very accurately about its horizontal axis, and for this purpose the mounting shown in Figs. 12 to 14 is provided. In this case the saw head 69 has a downward extension 70. The motor 13 is secured to a worm wheel 71 by screws 72, and a locking stud 73 passes through the worm wheel 71 and the extension 70 and carries a screw locking handle 74. A worm 75 carried by the head 69 cooperates with the worm wheel 71 and is operated by a crank 76.

A pointer 77 is carried by the forward face of the head 69, and suitable marks on the circumference of the worm wheel indicate the angular position of the saw.

When the saw is to be adjusted, the handle 74 is loosened, and crank 76 is rotated until the saw has been moved to the desired angular position, when the handle is again tightened to firmly hold the saw in place.

I claim:

1. A machine comprising a post, a bearing head, an arm riding over the bearing head, the arm being in the form of an inverted U-shaped member having a top, depending sides, and inwardly directed flanges having bearing surfaces diverging outwardly and upwardly, the bearing head carrying bearings engaging the inner surface of the top centrally thereof and the bearing surfaces of the flanges.

2. A machine comprising a post, a bearing head, an arm riding over the bearing head, the arm being in the form of an inverted U-shaped member having a top, depending sides, and inwardly downwardly directed flanges having bearing surfaces diverging outwardly and upwardly, the bearing head carrying bearings engaging the inner surface of the top centrally thereof, and adjustable bearings engaging the inner surfaces of the flanges.

3. In a device of the kind described, a supporting head, a tool carrying arm movable transversely of said head and consisting of a channel like member having a horizontal central portion and provided with flanges at its edges, said flanges having their inner surfaces inclined from the sides of the arm downwardly and providing bearing surfaces, the inner central portion of the arm also being formed as a bearing surface whereby there are provided three bearing surfaces inclined to each other, bearing wheels supported by said head and engaging the central bearing surface, means to adjust said wheels vertically, stub shafts carried by said head with their axes inclined toward each other and parallel to respective flange bearing surfaces, bearing wheels mounted on said stub shafts and engaging the flange bearing surfaces, and means to adjust the axes of said wheels toward and from the flange bearing surfaces.

In testimony whereof I affix my signature.

RAYMOND ELMER DE WALT.